United States Patent [19]

Smith

[11] 4,167,756
[45] Sep. 11, 1979

[54] SPLIT IMAGE CAMERA SYSTEM

[75] Inventor: William V. Smith, Memphis, Tenn.

[73] Assignee: Lectrolarm Custom Systems, Inc., Memphis, Tenn.

[21] Appl. No.: 829,253

[22] Filed: Aug. 30, 1977

Related U.S. Application Data

[63] Continuation-in-part of Ser. No. 721,502, Sep. 8, 1976, Pat. No. 4,058,831.

[51] Int. Cl.² ............... G02B 27/14; G03B 37/00; H04N 7/00; H04N 7/18
[52] U.S. Cl. .................................. 358/225; 350/174; 354/117; 354/122; 358/87; 358/108
[58] Field of Search ............... 358/225, 229, 87, 108, 358/107, 106; 352/70; 350/171, 174; 354/95, 117, 120, 122, 150

[56] References Cited

U.S. PATENT DOCUMENTS

| 2,786,096 | 3/1957 | Palmer | 358/107 |
|---|---|---|---|
| 2,889,941 | 6/1959 | Mehlis | 354/117 |
| 2,935,559 | 5/1960 | Dornier | 358/106 |
| 2,992,591 | 7/1961 | Courtney-Pratt | 354/117 |
| 3,041,393 | 6/1962 | Hennig | 358/100 |
| 3,144,806 | 8/1964 | Smith | 352/70 |
| 3,562,419 | 2/1971 | Stewart | 358/93 |
| 3,852,528 | 12/1974 | Robinson | 358/225 |
| 4,009,960 | 3/1977 | Feldman | 358/107 |

Primary Examiner—Howard W. Britton
Attorney, Agent, or Firm—LeBlanc & Shur

[57] ABSTRACT

A camera system for providing a split image field of view. The split image camera system utilizes two planar mirrors which are arranged along mutually intersecting planes so as to transmit images from different locations to the camera. The two mirrors are arranged such that their vertical axes are parallel while their horizontal axes intersect along the optical axis of the camera. By placing the reflective surfaces of the mirrors in a direction facing the camera, the camera is capable of viewing images from different locations and thus provides a split image view.

5 Claims, 9 Drawing Figures

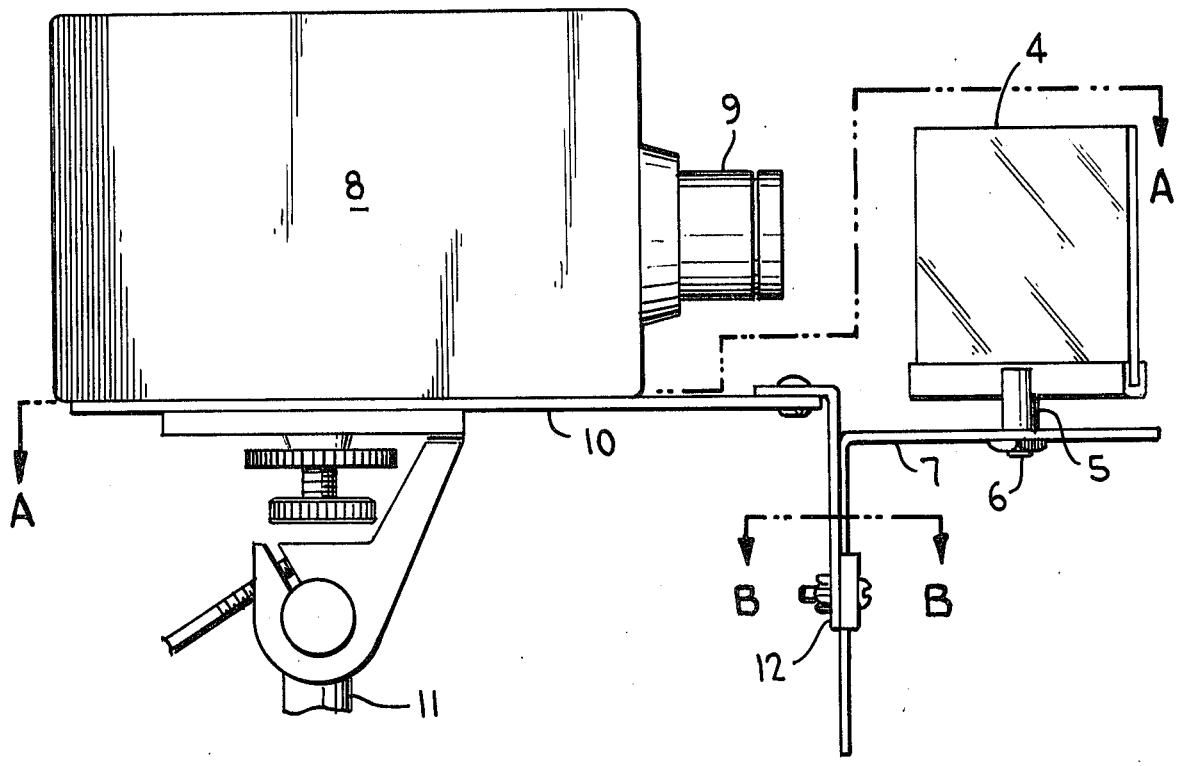
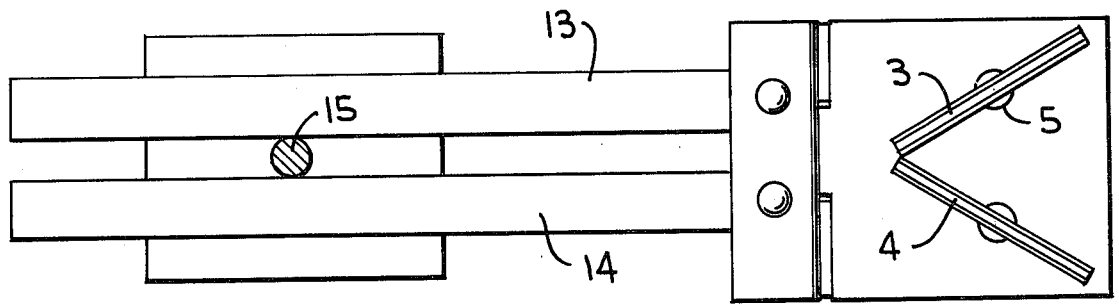
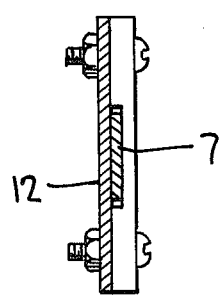

SPLIT IMAGE CAMERA SYSTEM

RELATED APPLICATION

The present application is a continuation-in-part of my prior U.S. application Ser. No. 721,502, filed Sept. 8, 1976, now U.S. Pat. No. 4,058,831.

BACKGROUND OF THE INVENTION

The present invention is concerned with providing a camera system enabling a viewer to simultaneously see at least two different fields of view.

A primary utilization of such a camera system is with a closed circuit television camera such as utilized for surveillance purposes in stores and hotels. The purpose of the system is to enable the viewer to simultaneously maintain under surveillance at least two different locations. Such a system is of particular use where it is desired to maintain surveillance over any actions occurring with a hallway in either direction from the location of the camera.

In most conventional systems which are available today, in order to provide any type of surveillance, it is necessary for the camera itself to physically scan the area. For this purpose, the camera is rotated through the desired scanning angle. Typically, a camera is placed against the wall with the camera rotating back and forth along a fixed path.

SUMMARY OF THE INVENTION

An object of the present invention is to provide a mirror system for utilization with a camera system which enables different fields of view to be simultaneously viewed by the camera.

Another object of the present invention is to provide a mirror system for utilization with a camera system which enables a camera to be utilized for providing views of actions occurring in different directions without requiring any movement of the camera itself.

A further view of the present invention is to provide a camera system in which the camera can be held in a stationary orientation while still being able to simultaneously obtain fields of view along at least two different directions.

In order to accomplish these objectives, the split image camera system of the present invention utilizes a mirror system having two planar members each having a reflective coating on one of its surfaces. The two planar mirrors are adjustably mounted on a mounting bracket in such a manner that their vertical axes extend parallel to each other while their horizontal axes extend in a direction so as to intersect at a location along the optical axis of the camera. The reflective surfaces of the mirrors are arranged in a direction so that images are reflected from their respective reflective surfaces along the optical axis towards the camera.

In one embodiment of the present invention, the two planar mirror members are arranged so that their edges facing the camera are in contact. If the mirrors are arranged in this manner, then the camera is capable of viewing objects located both to the right and to the left of the camera. In an alternative embodiment, the mirrors are arranged with a slight separation between the front edges. In this case, the camera is capable of viewing objects directly in front of the camera on the opposite side of the mirrors.

The camera in this system is adjustably mounted on a mounting bracket, which is attached to the mounting bracket for the mirror system. In this manner, the camera can be adjusted so as to be moved along its optical axis relative to the planar mirrors thereby allowing for adjusting the view to be obtained from the reflective surfaces of the planar mirrors.

BRIEF DESCRIPTION OF THE DRAWINGS

FIG. 7 is a side elevational view of the split image camera system of the present invention.

FIG. 8 is a top plan view taken along lines A—A of the system illustrated in FIG. 7.

FIG. 9 is a sectional view taken along lines B—B of the system illustrated in FIG. 7.

DESCRIPTION OF THE PREFERRED EMBODIMENTS

Figure 1:
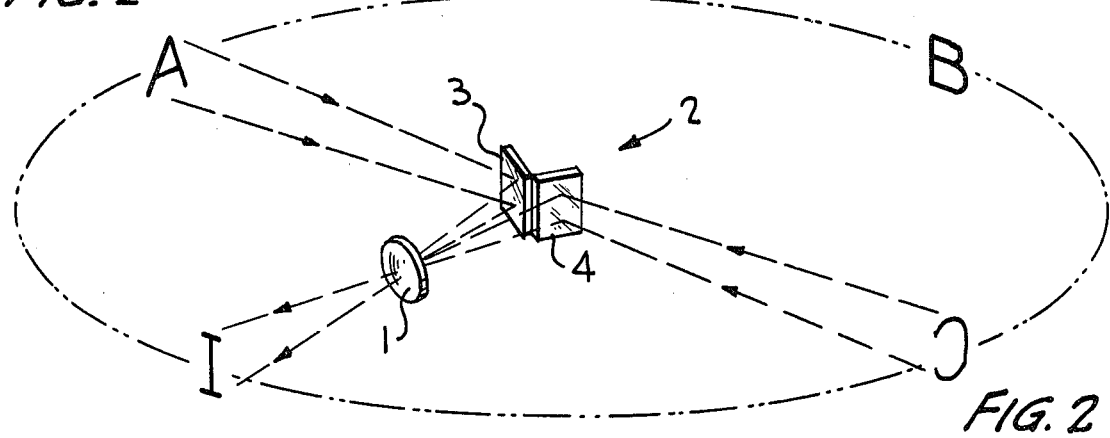
FIG. 1 schematically illustrates a first embodiment of the present invention.
Figure 3:
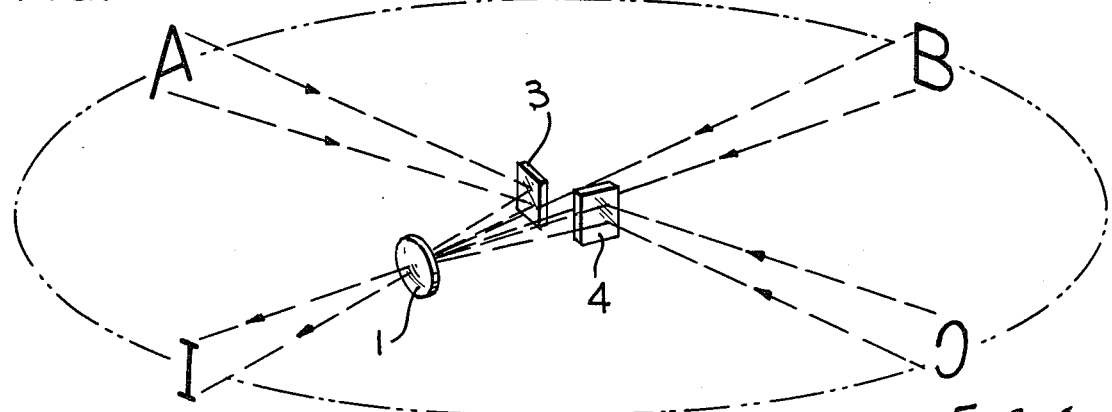
FIG. 3 is a schematic illustration of a second embodiment of the present invention.
Figure 5:
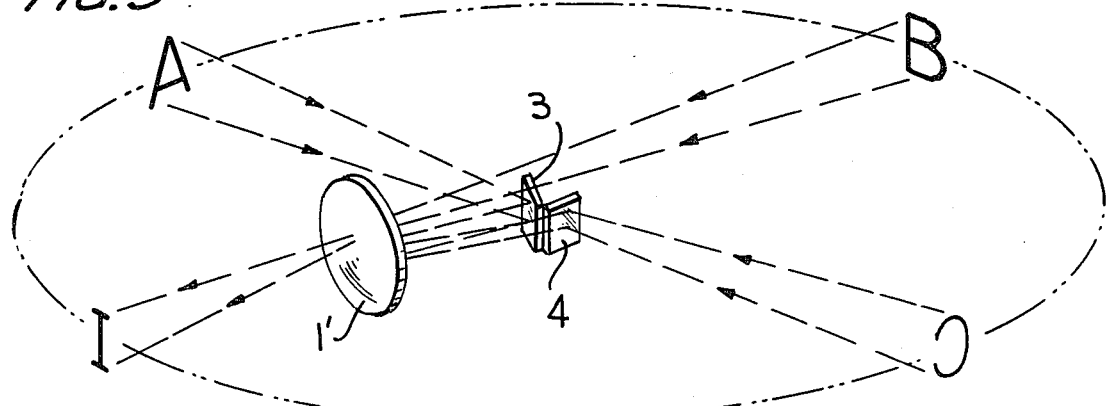
FIG. 5 is a schematic illustration of a third embodiment of the present invention.

The operation of the system of the present invention can be best understood through the schematic illustrations of the various embodiments in FIGS. 1, 3 and 5. The split image camera system includes a camera schematically represented by lens 1 and a planar mirror system 2 including two planar mirrors 3 and 4. Planar mirrors 3 and 4 are mounted such that the vertical axes of the planes extend parallel to each other while the horizontal axes of the planes intersect along the optical axis of the camera.

Figure 2:
FIG. 2 is a representational illustration of the image received when using the system illustrated in FIG. 1.

When the mirrors are arranged so that their front edges are in contact, as shown in FIG. 1, image A is reflected by mirror 3 along the optical axis and simultaneously image C is reflected by mirror 4 along the optical axis. Thus both images A and C pass through lens 1 to the image plane I and as seen in FIG. 2 images A and C are simultaneously viewed by the camera.

Figure 4:
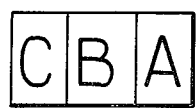
FIG. 4 is a representational illustration of the image received when utilizing the system illustrated in FIG. 3.

When mirrors 3 and 4 are separated so that their front edges are not in contact, as illustrated in FIG. 3, the camera is capable of simultaneously viewing images from three different locations. Thus, in the embodiment shown in FIG. 3, images A and C are respectively reflected by mirrors 3 and 4 while lens 1 is also capable of obtaining a view from the space between the two mirrors so as to view image B. The final resulting image I as seen by the camera is shown in FIG. 4.

Figure 6:
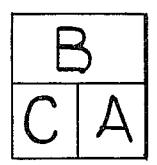
FIG. 6 is a representational illustration of the image received when utilizing the system illustrated in FIG. 5.

In a further modified embodiment of the present invention, a larger lens can be utilized so that images are obtained both from mirrors 3 and 4 and also from over the top of the mirrors. Thus with the embodiment shown in FIG. 5 when utilizing a larger lens 1' it is possible to simultaneously view images A and C through mirrors 3 and 4, respectively, and image B from over the top of the mirrors. The final image I is shown in FIG. 6.

An actual embodiment of the split image camera in accordance with the present invention is illustrated in FIG. 7. In FIG. 7, only one of the two mirrors, mirror 4, is visible. Mirror 4 is held within a holder 5 which is secured to a mounting bracket 7 by a screw 6. By sliding mirrors 3 and 4 within their respective holders 5 and by adjusting the holders via screws 6 the positions of the mirrors, including the angle between the mirrors, can be adjusted.

This system also includes a camera 8 having a lens 9 that is positioned at a location adjacent to the area of mirror system 2. If the system is used as part of a closed circuit surveillance system, then camera 8 would be a video camera. The optical axis of camera 8 is perpendicular to the vertical axes of mirrors 3 and 4. Thus images are reflected off of the two reflective surfaces of mirrors 3 and 4 into camera 8 through lens 9.

Respective mounting brackets are provided for supporting the mirror assembly and the camera. As previously noted the holders 5 are secured to mounting bracket 7; on the other hand, camera 8 is attached to a mounting bracket 10. Brackets 7 and 10 are inturn coupled together through coupling joint 12. Since bracket 7 is merely fixed in a guide slot provided between bracket 10 and coupling number 12, it is possible to adjust the vertical height of the mirror assembly with respect to the optical axis of camera 8.

In order to support the entire assembly, camera 8 can be mounted on top of a tripod or stand 11. The mounting screw 15 which is attached to camera 8 is movable between arms 13 and 14 of mounting bracket 10. Thus camera 8 can be moved along its optical axis towards and away from mirror system 2.

It is noted that the above descriptions and the accompanying drawings are provided merely to present exemplary embodiments of the present invention and that additional modifications of these embodiments are possible within the scope of the invention without deviating from the spirit thereof.

I claim:

1. A split image camera system comprising:
   a camera;
   two planar members, each having a reflective coating on one of its planar surfaces; and
   means for mounting both of said planar members such that the horizontal axes of said planar members intersect and the vertical axes of said planar members are substantially parallel with each other, wherein said planar members are mounted on said mounting means such that their reflective surfaces are facing the camera with which the mirror system is utilized and said planar members having their adjacent side edges closest to the camera and said side edges being separated by a sufficient distance so that a portion of the optical path of said camera is capable of obtaining a view from in between said planar members.

2. A system as defined in claim 1 wherein said planes of said planar members are arranged such that the view reflected by said reflective surfaces of said planar members to said camera only covers a portion of the optical view of said camera.

3. A system as defined in claim 1 wherein said planes of said planar members are arranged such that the view reflected by said reflective surfaces of said planar members to said camera only covers a portion of the optical view of said camera.

4. A system as defined in claim 1 wherein said camera is a video camera.

5. A split image camera system comprising:
   a camera;
   two planar members, each having a reflective coating on one of its planar surfaces;
   means for mounting both of said planar members such that the horizontal axes of said planar members intersect and the vertical axes of said planar members are substantially parallel with each other, wherein said planar members are mounted on said mounting means such that their reflective surfaces are facing the camera with which the mirror system is utilized; and
   further means for mounting said camera, said further mounting means for said camera being coupled to said mounting means for said planar members and said camera being adjustably mounted on said further mounting means such that said camera can be moved in a direction along its optical path relative to said planar members.

* * * * *